United States Patent [19]

Masters et al.

[11] 4,421,015

[45] Dec. 20, 1983

[54] RADIANT HEAT COOKING APPARATUS

[75] Inventors: Adrian G. Masters; Jeffery E. Munden, both of Maidenhead, England

[73] Assignee: United Biscuits (UK) Limited, Middlesex, England

[21] Appl. No.: 263,960

[22] Filed: May 15, 1981

[30] Foreign Application Priority Data

May 16, 1980 [GB] United Kingdom ............... 8016223
May 16, 1981 [GB] United Kingdom ............... 8108188

[51] Int. Cl.³ ........................................... A47J 27/62
[52] U.S. Cl. ........................................ 99/332; 99/339;
99/355; 99/386; 99/389; 99/391; 99/400;
99/401; 426/243
[58] Field of Search ................. 49/339, 386, 389, 390,
49/391, 400, 401, 443 C, 331, 332, 334, 355;
426/243; 219/400, 388

[56] References Cited

U.S. PATENT DOCUMENTS

| 1,692,956 | 11/1928 | Russell . | |
|---|---|---|---|
| 2,151,401 | 3/1939 | Belcher | 99/334 |
| 2,340,354 | 2/1944 | Wells . | |
| 2,860,225 | 11/1958 | Steen . | |
| 2,864,932 | 12/1958 | Forrer . | |
| 3,037,443 | 6/1962 | Newkirk et al. . | |
| 3,249,741 | 5/1966 | Mills . | |
| 3,334,620 | 8/1967 | Werth . | |
| 3,448,678 | 6/1969 | Burstein | 99/386 |
| 3,693,536 | 9/1972 | Carville | 99/386 |
| 3,783,219 | 1/1974 | Tateda | 219/400 |
| 4,154,152 | 5/1979 | Lang-Ree | 99/339 X |
| 4,254,697 | 3/1981 | Lang-Ree et al. . | |
| 4,286,509 | 9/1981 | Miller | 99/386 |

FOREIGN PATENT DOCUMENTS

| 1429950 | 5/1969 | Fed. Rep. of Germany . |
| 2546106 | 4/1977 | Fed. Rep. of Germany . |
| 2230293 | 5/1975 | France . |
| 8002224 | 10/1980 | France . |
| 340257 | 12/1971 | Sweden . |
| 693878 | 7/1953 | United Kingdom . |
| 1257583 | 12/1971 | United Kingdom . |
| 1505624 | 3/1978 | United Kingdom . |

OTHER PUBLICATIONS

Lebensmittel Wissenschaft und Technologie, vol. 12, pp. 252–257, (1979), (Dagerskog).
"Application of Infra-Red Radiation in Food Processing", (Leonard-Hill, London, 1969), p. 357, (Ginsberg).

Primary Examiner—Billy J. Wilhite
Attorney, Agent, or Firm—Seidel, Gonda & Goldhammer

[57] ABSTRACT

Food articles are heated by radiation in the near infrared wavelength range of 0.72 μm to 2.5 μm. Food articles can be thawed, heated or fully cooked direct from the frozen condition in this way. Hamburger patties are cooked in a conveyor cooker between rows of sources of such radiation. The sources are energized at half voltage during standby periods so that the conveyor is held at a temperature such that it has a searing effect on patties cooked by exposure to the radiation. Full energization is effected by operation of a switch in response to placement of a patty on the conveyor through a flap connected with the switch. A separate conveyor carries hamburger bun halves beneath a third row of the sources. In a static area employing sources of the radiation, reflector and screening arrangements provide even diffuse radiation in the heating zone and control of the heating effect is obtained by selective energization of the sources for selectively variable periods.

16 Claims, 5 Drawing Figures

RADIANT HEAT COOKING APPARATUS

BACKGROUND OF THE INVENTION

The invention relates to an apparatus for heating foodstuffs, in particular by radiant heat.

There is disclosed in U.S. Pat. No. 3,448,678 a radiant heat conveyor cooker for cooking various food products by conveying the products along a conveyor run between upper and lower banks of heating elements at a surface temperature of about 1,800 to 2,000 degrees F., which emit radiation over a range of wavelengths from about 0.4 $\mu$m to about 400 $\mu$m. The cooking operation is said to depend on short and long infrared radiation and also on long ultraviolet radiation. The use of such heating elements affords advantages over cookers with heating elements operating at lower temperatures, but it remains desirable to provide a food heating apparatus by which improved cooking performance, and more convenient and efficient operation, are obtained.

It is thus an object of the invention to provide a food heating apparatus requiring minimal energy consumption.

It is a further object of the invention to provide a food heating apparatus in which a predetermined degree of heating can be effected within an minimal time period.

It is also an object of the invention to provide a apparatus in which a frozen food article can be heated directly to a thawed, heated or cooked condition, without any intermediate step between removal from storage and the start of the heating process.

It is a further object of the invention to provide heating apparatus capable of heating food articles to high temperatures whilst itself remaining at a relatively low temperature.

It is a further object of the invention to provide a food heating apparatus having through-flowing air cooling arrangements providing exhaust air which is relatively clean and cool.

It is also an object of the invention to provide for the cooking of food products quickly without substantial shrinkage.

It is a further object of the invention to provide an apparatus for heating food articles combining versatility, safety and an efficient energy transfer from an energy source to the food articles.

It is also an object of the invention to provide a food heating apparatus employing a single type of radiation source and affording selectively variable heating programmes.

It is a further object of the invention to provide a cooking apparatus which is relatively clean in operation.

BRIEF SUMMARY OF THE INVENTION

In accordance with the invention, there is provided a food heating apparatus in which food articles are heated by exposure to infrared radiation, from sources supplying radiation concentrated in the near infrared wavelength range, that is, within the range of 0.72 $\mu$m to 2.5 $\mu$m, preferably, within the range of 0.9 $\mu$m to 1.8 $\mu$m or the narrower range of 0.9 $\mu$m to 1.5 $\mu$m. Such radiation may be obtained from sources with an intensity peak normally between the wavelengths of 1.2 to 1.3 $\mu$m. Only radiation of wavelength at and near this peak contributes effectively to the cooking process. By selection of radiation in this relatively narrow wavelength band, unexpected advantages are obtained, of notably quicker heating, and of a cooked product of improved quality. Energy is transferred from the radiation sources to the food articles with high efficiency in that relatively very little energy need be wasted in heating the atmosphere within the apparatus and the apparatus itself. Food articles can be heated to high temperatures whilst the apparatus remains relatively cool and consequently stable. Where a cooling air flow is required, as in fast food restaurants where the apparatus undergoes protracted use, the air flow, which can be by convection or induced mechanically by an impeller, can be relatively small in volume and flow rate, and the exhaust is cleaner and at a lower temperature than with conventional cooking apparatus with a similar throughput, because less wasteheat and fumes occur. The high temperature at which the radiation sources operate has a cleaning effect on the cooking zone in vaporising carbonised wastes which form thereon.

The apparatus of the invention can be applied to the heating of food products directly from the frozen condition, the heating being carried through to thawing heating or to complete cooking, as required. A manufactured prepared meat product such as a hamburger patty of say 6 mm thickness can be cooked directly from the frozen condition, in which it is typically at a temperature of $-18°$ C., without the need for any initial step such as the indentation step often needed to increase the surface area when cooking is performed by conventional methods. Such products cooked in this way are found to be advantageously improved in flavour, texture and appearance. Moreover, they undergo much less shrinkage during the cooking process.

The invention can be embodied in a static cooking apparatus, for use domestically, or in restaurants. Uniformity between successive cooking operations can be reliably achieved by preset timing means controlling energisation of the radiation sources, the duration of energisation being a fixed or selectively variable period or a selected one of a plurality of fixed periods. The intensity of heating can be controlled by selective energisation of less than all of the radiation sources, and/or by pulsing the energisation.

Certain food articles such as hamburger patties are desirably seared, and for cooking such articles, a support is provided, for example in the form of an open metal grid, which is capable of storing heat, and the radiation sources are maintained at less than the full operating voltage between cooking operations so as to maintain the support at a temperature sufficient for searing the food article. Cooking takes place when the full operating voltage is applied to the sources. Searing is then ensured with economy of energy consumption.

The support for the food articles can be constituted by a conveyor which carries the articles between or beneath the radiation sources. The conveyor speed can be selectively adjustable to provide a further control facility. A plurality of conveyors can be provided for heating different articles. For example, where the apparatus is arranged for cooking hamburgers, it can incorporate a second conveyor, and associated radiation sources in accordance with the invention for heating hamburger buns. Because of the wavelength distribution of the radiation to which they are exposed, the bun halves are heated through as well as toasted on one side, thus providing an improved product. The presence of a food article on the conveyor may be sensed at a convenient position on its path and the infrared sources energised or raised from a lower to the full working voltage in response to this sensing, which can be effected mechanically, as by a switch actuated by a flap moved by the food product as it enters the heating zone between the near infrared radiation sources.

The apparatus of the invention can be organized to provide a plurality of individually controlled food heating channels side-by-side along the length of the conveyor, to further economise on energy consumption. Each channel may be defined by a respective food article sensing means and radiation sources controlled thereby. The sources conveniently have an elongate tubular form, and can extend lengthwise along the conveyor. The casing to the cooking apparatus is advantageously double walled at least in part, to allow air flow between the walls for cooling purposes. Advantageously, the ends of the radiation sources extend outwardly of the actual cooking chamber into passages containing an induced airflow for cooling the terminations of the sources.

The invention thus has particular advantages for fast food restaurants, because food items can be made ready for serving at speeds much exceeding those at which cooking can be done with conventional equipment and without the waste of energy incurred by continuous operation of such equipment.

In practice, the invention provides cooking speeds which approximate to and can even exceed those attainable with microwave ovens, without the possible danger to staff, the heavy capital expense and other known disadvantages that the use of these ovens involves. Heating of the food articles by the method of the invention is effected by conduction inwardly however with very high penetration of radiant heat, so the disadvantages of heat generation within the food article are avoided.

Although described mainly in connection with the cooking of hamburgers, the invention is applicable generally to the heating and cooking of food articles, including manufactured food articles, and compound articles such as meat pies.

The invention is thus applicable to the manufacture of wheat based products for example to the baking of cakes, biscuits, cookies and pizza bases. This can be done on a continuous production basis, the raw food articles, after shaping, being fed onto a conveyor by which they are carried through a baking oven containing upper and lower banks of near infrared heaters, the conveyor having an apertured support structure to expose the lower sides of the food articles undergoing baking.

The invention is further described below, by way of example, with reference to the accompanying drawings, in which.

Figure 1:
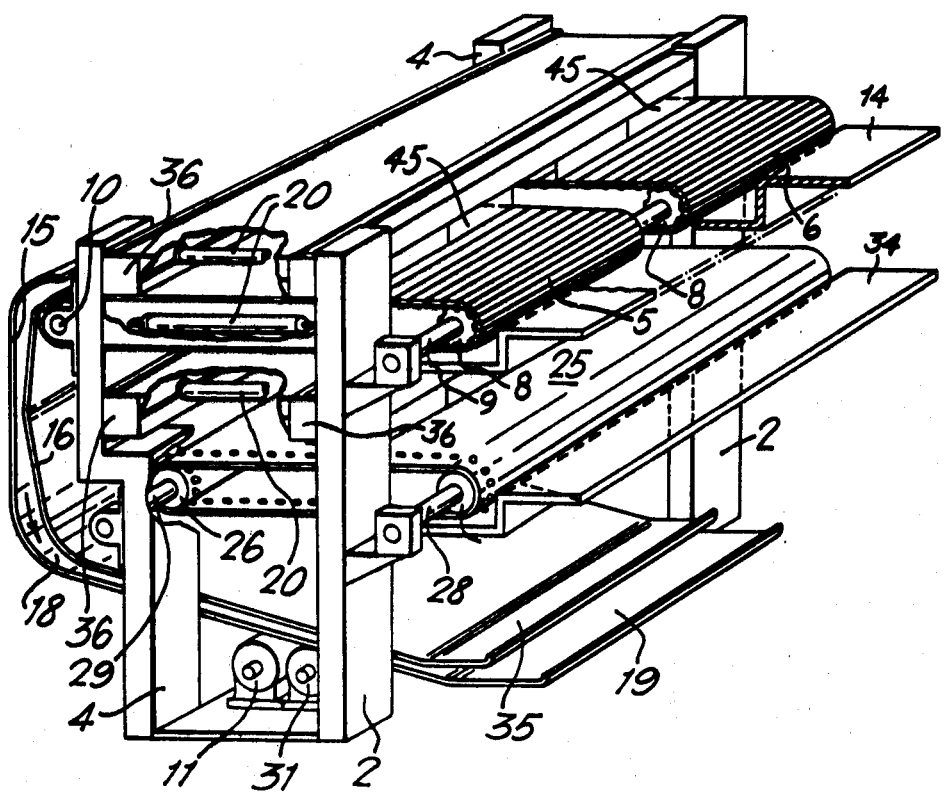
FIG. 1 is a schematic perspective view of an infrared conveyor cooking apparatus according to the invention, shown with parts omitted and others broken away.

Referring to FIGS. 1 to 4 of the drawings, the illustrated conveyor cooking apparatus comprises a frame including two front pillars 2 and two rear pillars 4. At the upper part of the apparatus an adjacent pair of hamburger conveyors, with belts 5,6, is provided. Each belt 5,6 is of ladder construction, that is, it comprises transversely extending bars joined to flexible links at their ends, the links forming a chain engaged by sprockets 8. The two conveyors extend side-by-side and have upper and lower horizontal runs extending through the frame of the apparatus. At the front of the apparatus, the sprockets 8 are on a common spindle 9 and at the back, the sprockets 8 are on a common spindle 10 driven by an electric motor 11 located at the base of the frame through a chain drive 12. At the front of the apparatus, a shelf 14 is provided for receiving hamburgers to be cooked, before they are loaded onto the upper run of the conveyor belts 5,6 for passage through the apparatus. At the rear of the apparatus, a rear cover 15 and an internal partition 16 provide between them a passage 18 for receiving hamburgers falling from the upper run of the belts 5,6 as these turn round the rear sprockets 8. The passage 18 has an initial vertical portion, in which any superficial fat is drained off the hamburgers, and continues forwardly and downwardly, the inner side of the cover 15 providing an inclined plane extending through the apparatus and projecting forwardly beyond its front face to constitute a shelf 19 from which cooked hamburgers can be collected manually for serving.

The cooking of hamburgers travelling along the upper run of the conveyor belts 5,6 is effected by an upper bank of near infrared radiation sources, above the upper run and by a lower bank of like sources, located beneath the upper run, between it and the lower run. Each source comprises an elongate envelope or tube 20 of quartz containing a resistive element capable of emitting radiation concentrated in the near infrared wavelength range between 1.5 $\mu$m to 0.72 $\mu$m with an intensity peak around 1 $\mu$m. The two banks of the tubes 20 are mounted in respective racks 21 and 22, so that the tubes extend longitudinally of the path of travel of the hamburgers on the conveyor. Each bank of the tubes 20 is backed by a reflector 24, of aluminium or other highly reflective metal surface, so that the near infrared radiation from the tubes is directed onto the upper runs of the belts.

The belts 5,6 are together of sufficient width to accommodate several hamburgers side-by-side, and thus provide a plurality of cooking channels. Separate control arrangements for these can be provided. Thus a plurality of the flaps 45 can be provided across the apparatus, each controlling only the tubes 20 which are operative over the channel entered by way of the associated flap. By this means, only those tubes 20 actually needed for cooking are raised to the working temperature when the apparatus is being used at less than its full capacity.

Below the belts 5,6, the frame mounts a lower conveyor with a belt 25 which has a configuration similar to that of the hamburger conveyors above it. The material of the belt 25 is of Teflon coated glass fibre material provided with apertures along its edge for engagement by sprockets 26, on front and rear spindles 28,29. The rear spindle 29 is driven through a chain drive 30 by an electrical motor 31 at the base of the frame. Above the upper run of the belt 25 is mounted a third rack 32 mounting a bank of the tubes 20 for heating bun halves on the upper run of the belt 25 by near infrared radiation. No initial searing of the bun halves is required and such searing is avoided by the choice of material for the belt, which is such as not to retain much heat.

A second shelf 34 is provided at the front of the apparatus for receiving hamburger bun halves before they are manually loaded onto the belt 25. At the rear of the apparatus, heated bun halves fall from the belt 25 onto the partition 16 which provides an inclined surface overlying and parallel to the lower part of the cover 15, so that the bun halves are gravitationally fed to a shelf 35 above the shelf 19 at the front of the apparatus, ready to be assembled with the cooked hamburgers and served.

The three racks 21, 22 and 32 carrying the tubes 21 are of like construction. Each rack can be removed as a whole from the apparatus in the event of a failure of one of the tubes, and can then be replaced by a spare rack, so that the apparatus is out of use for only a very short interval.

Each of the racks 21, 22, 32 comprises a square-section duct 36 at the front end and another at the rear, with the reflector 24 extending between the opposed walls of the two ducts. Each of the tubes 20 extends through apertures in these opposed walls and is supported, and electrically connected to a suitable electrical supply source, within the respective duct.

Figure 3:
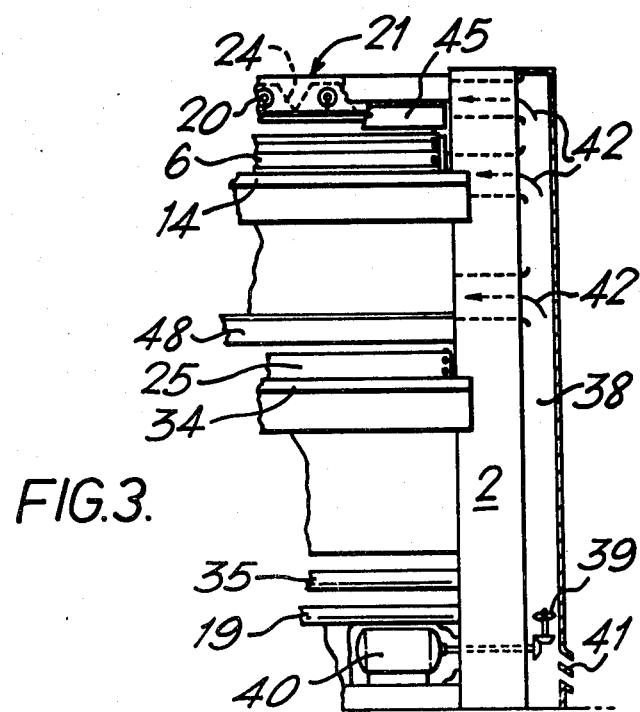
FIG. 3 is a partial schematic front view of the apparatus, again with parts shown broken away.
Figure 4:
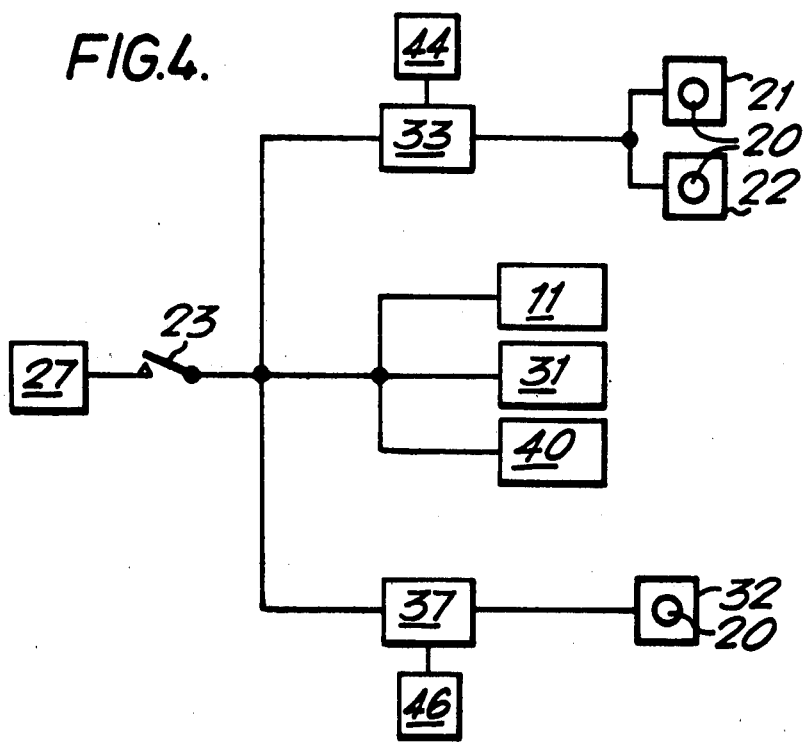
FIG. 4 is a schematic block circuit diagram of the circuitry associated with the apparatus of FIGS. 1 to 3.

As schematically shown in FIG. 3, cooling air is circulated through the ducts 36 of the racks 21, 22, 32. At least the side panels 38 of the apparatus are of double-wall construction, and an impeller 39, driven by an electric motor 40 is positioned within the side panel shown, to draw in ambient air through louvres 41 at the foot of the apparatus and to impel it upwardly within the panel for distribution laterally through the ducts 36 as indicated by arrows 42. After passage along the ducts 36, the air escapes at the other side of the apparatus, having collected heat from the ends of the tubes 20 in particular and cooling the apparatus as a whole. A small volume of air flow through the cooking chamber is advantageous and greatly reduces "flaming".

When a main control switch 23 is closed the three electric motors 11,31,40 are set in operation by connection to an electric supply source 27, and power is supplied from the source to the tubes 20 in the upper and middle racks 21,22. This power is supplied through a control device 33 such that the voltage reaching the tubes is not the full working voltage at which the tubes produced infrared radiation with an intensity peak in the near infrared wavelength region. Instead, a much lower voltage, for example, half the normal working voltage, is applied, so that the tubes provide infrared radiation with an intensity peak at a longer wavelength, for example, in the middle or far infrared. This radiation serves to heat the belts 5,6 to an appropriate temperature initially, and to maintain this standby temperature during periods in which the apparatus is not actually cooking, but is ready for cooking immediately.

Figure 2:
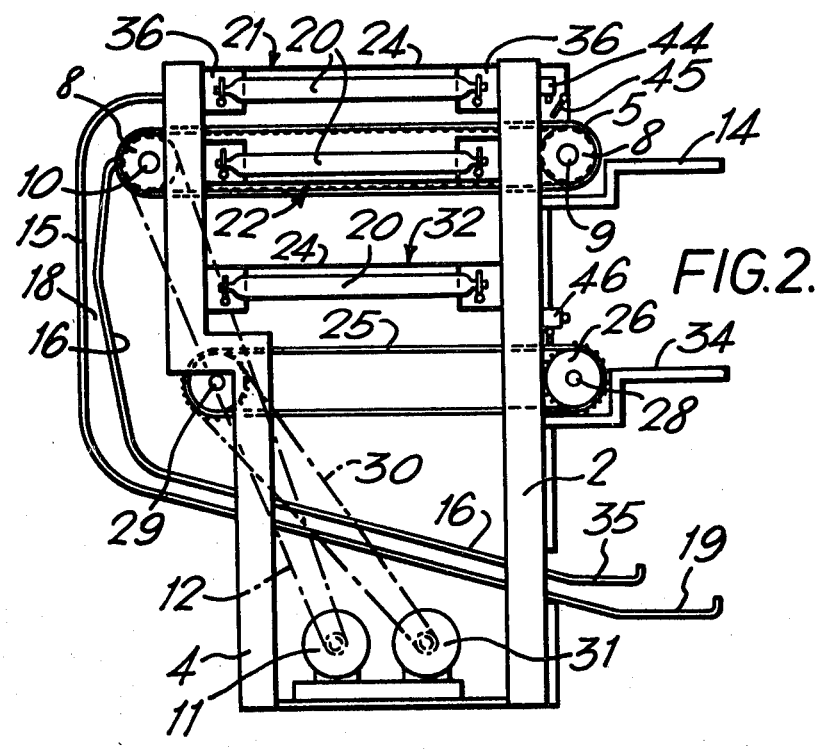
FIG. 2 is a schematic side view of the apparatus, again shown with parts omitted.

The tubes 20 of the upper and middle racks 21,22 are raised to the full working temperature in response to the placing of one or more hamburgers on the belts 5,6. Any suitable means can be provided for detecting the presence of a hamburger on the belts, and the apparatus is provided with a microswitch 44 operated by a flap 45 which has to be tilted clockwise as shown in FIG. 2 in placing a hamburger on the belt. The flap 45 also serves to retain the radiation therein within the interior of the apparatus. Closure of the switch 44 causes the control device 33 to increase the standby voltage applied to the tubes 20 to the full working voltage for a predetermined time which ends not later than the time at which the hamburger leaves the zone in which it is irradiated by the near infrared radiation from the tubes. Placement of a second or further hamburger on the conveyor will result in further operation of the switch 44, thereby extending the period during which the control device 33 maintains the tubes 20 at normal working temperature, until the last of any series of hamburgers on the belts 5,6 has been heated for a predetermined time.

The tubes 20 of the rack 32 are de-energised even during the stand-by condition of the apparatus. When a pair of bun halves are placed on the belt 25, the tubes sources are energised, not immediately to the full working voltage, in order to conserve their life, but after a suitable delay for example of half a second, imposed by a delay device 37, during which a lower voltage, for example half voltage, is applied. The bun halves do not have sufficient weight to operate a switch to initiate energisation by a flap operated switch, although a flap 48 is provided to shield the user's eyes from radiation within the apparatus. A switch 46 is therefore provided for manual operation to initiate the energisation cycle. Again, the radiation sources are de-energised after a predetermined time which is extended if the switch 46 is actuated again, on the placing of further bun halves on the belt 25. Instead, the tubes 20 of the rack 32 can be arranged to be energised for a predetermined time in response to the energization of the tubes of racks 21 and 22 at full voltage.

At the start of a cooking session, the apparatus is brought into the standby condition. The conveyor belts 5,6 and 25 are set in operation, and the tubes 20 of racks 21 and 22 are energised at the lower voltage, so as to emit radiation predominantly of a wavelength longer than the predominantly near infrared wavelength they will emit when raised to the fully operational voltage. During this warm-up time, hamburgers, in the frozen condition, and bun halves can be placed on their respective reception shelves 14 and 34.

As soon as the apparatus has reached its standby temperature, one or more hamburgers can be placed on the belts 5,6 with movement of the flaps 45 so as to operate the associated switches 44 for applying the full working voltage to the tubes 20. A pair of bun halves for each hamburger can be pushed onto the belt 25 by way of the flap 48 and the switch 46 operated to fully energize the tubes 20 of the rack 32, after a short warm-up time. The hamburger and buns are carried through the apparatus by the conveyor belts and fall from the rear ends of these downwardly and then forwardly to the trays 19 and 35. The tubes 20 of racks 21 and 22 will return to the standby energization level, and those of rack 32 will be switched off, at the ends of predetermined intervals, which are not necessarily the same. By appropriate selection of the spacing of the tubes 20 from the belts 5,6 and the speed of the belts, a standard ¼ lb. hamburger can be cooked in 100 to 120 seconds, the product being of excellent quality and retaining substantially its original size.

The apparatus of FIGS. 1 to 4 could be modified for example to deliver the cooked hamburgers and the heated bun halves at the rear of the frame instead of at the front. To suit the cooking of a variety of food articles, various operational parameters, for example, conveyor belt speed and the time during which the radiation sources are fully energized, can be selectively variable; preferably the apparatus provides for selection between a plurality of preset cooking programmes, each appropriate to a respective food article.

Figure 5:
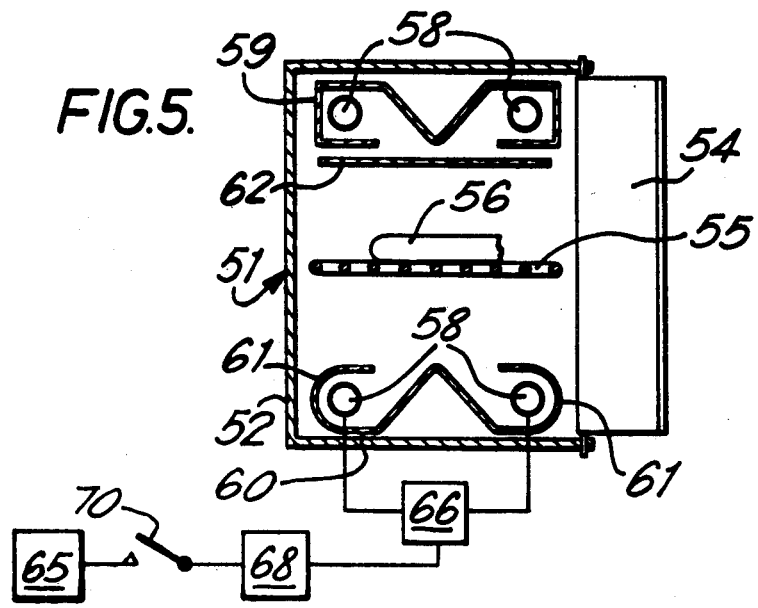
FIG. 5 is schematic sectional side view of an oven embodying the invention.

FIG. 5 shows a simpler apparatus in accordance with the invention in the form of an oven for heating or cooking a variety of food articles. The illustrated oven 51 comprises a rectangular cabinet 52 with a door 54 and having mounted therein a central horizontal grid 55, of open structure so as to be substantially transparent to radiation, for supporting one or more food articles 56 thereon. Above and below the grid 55 are secured heating units each comprising a pair of elongate tubular near infrared heat sources 58, which may be similar to the tubes 20 of FIGS. 1 to 4, mounted within a bent metal reflector. The reflector 59 of the upper unit is of reflective metal sheet bent into adjoining flat portions along fold lines extending parallel to the axes of the heat sources 58. The reflector 59 is shaped to protect the quartz envelopes of the sources 58 from fat or the like which might escape from the articles being cooked, and to direct radiation from the sources substantially uniformly over these articles. The heating units may be identical but as shown at the lower part of FIG. 5, a modified form of reflector 60 may be employed in which portions 61 are carried, preferably parabolically, with the adjacent source 58 positioned so that radiation from it reflected by the curved portion is at least approximately parallel. By these means, the radiation from the sources 58 is controlled so as to be diffused more uniformly over the heating zone in which the food article 56 is received.

In an alternative radiation screening arrangement, a reflector of simple shape, for example a generally planar reflector sheet, is used in each heating unit and an opaque screen 62 of metal for example is placed between the sources 58 and the food articles 56. The radiation is then diffused into the heating zone by reflection from the oven walls around the edges of the screen 62.

The heat sources 58 are connected to an electric supply source 65 through control arrangements by which the intensity of radiation and the time during which the sources are energized can be selectively varied. The intensity of the radiation in the heating zone, and thus the rate at which heating occurs, is adjustable by selection of the number of the sources 58 which are energized during a heating cycle by operation of a selector device 66, and the duration of the heating cycle is selectively adjustable by means of a timing device 68 controlling a switch 70. The switch 70 is preferably linked with the door 54 so that a heating cycle cannot be started until the door is closed.

An air flow through the oven interior may be provided, as for removal of fumes. Cooling arrangements for the terminations of the heat sources 58 can resemble those of FIGS. 1 to 4. Appropriate features of the two forms of apparatus specifically described and illustrated, for example, the screen or reflector and control arrangements can of course be interchanged between them.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. An apparatus for heating a food article, said apparatus comprising means defining a heating zone, support means positioned to support a food article in said heating zone, source means of radiation for heating a food article on said support means, said source means when energized at a first voltage level producing radiation having maximum intensity at a wavelength between 0.72 $\mu$m and 2.5 $\mu$m and when energized at a second voltage level lower than said first voltage level producing radiation having maximum intensity at a wavelength greater than 2.5 $\mu$m, means for energizing said source means at either said first or said second voltage level, sensing means for sensing the presence of a food article on said support means, and control means adapted to change said source means energization from said second voltage level to said first voltage level in response to the sensing of a food article on said support means by said sensing means.

2. The apparatus of claim 1 wherein said source means comprises two spaced sets of radiation sources and said support means is located between said two sets of radiation sources, said support means allowing a food article supported thereby to be heated by said radiation from both said sets of sources.

3. The apparatus of claim 2 wherein said support means comprises a heat-retaining grid which, when said source means is energized at said second voltage level, is maintained by radiation from said source means at a temperature sufficiently high to cause searing of a food article when said food article is placed upon said heat-retaining grid.

4. The apparatus of claim 1 further comprising reflector means for directing said radiation onto a food article on said support means.

5. The apparatus of claim 1 wherein said support means comprises conveyor means operable to carry at least one food article through said heating zone.

6. The apparatus of claim 5 wherein said control means is adapted to maintain said source means energization at said first voltage level for a predetermined time period after said change in energization of said source means, said predetermined time period being not longer than the time period in which the food article is carried by said conveyor means through said heating zone.

7. The apparatus of claim 5 further comprising means defining a conveyor loading position and means defining a conveyor discharge position, said conveyor means comprising an endless belt having a run extending from said loading position, through said heating zone to said discharge position.

8. The apparatus of claim 7 further comprising guide means for receiving a food article falling from said belt run at said discharge position and for guiding said article to the vicinity of said loading position.

9. The apparatus of claim 1 further comprising a housing means, said housing means being constituted at least in part by panel means having spaced inner and outer walls, and source means comprising at least one elongate radiation source, said radiation source having the ends thereof extending into the space between said inner and outer walls, and means for promoting air flow between said inner and outer walls to cool said ends of said radiation source.

10. The apparatus of claim 9 wherein said air flow promoting means comprises a motor-driven impeller.

11. An apparatus for heating a food article, said apparatus comprising a means defining a heating zone, support means positioned to support a food article in said heating zone, source means of radiation for heating a food article on said support means, said source means being energizable at a first voltage level to produce radiation having maximum intensity at a wavelength between 0.72 $\mu$m and 2.5 $\mu$m, said support means comprising conveyor means operable to carry at least one food article through said heating zone, said source means comprising at least two separately energizable portions in side by side relationship relative to the direction of conveyor movement for heating food articles lying in corresponding side by side portions of said conveyor means, sensing means for sensing the presence of a food article on said conveyor means, and control means responsive to said sensing means to cause energization of each said source means portion corresponding to a said portion of said conveyor means in which a food article lies.

12. The apparatus of claim 11 wherein said source means is further energizable at a second voltage level, lower than said first voltage level, to produce radiation having maximum intensity at a wavelength greater than 2.5 $\mu$m, said control means being adapted to cause energization at said second voltage level of all of said source means portions in the absence of a food article from said conveyor means and being responsive to said sensing means to cause energization at said first voltage level of each said source means portion corresponding to a said portion of said conveyor means in which a food article lies.

13. An apparatus for heating a food article, said apparatus comprising a means defining a heating zone, first source means of radiation for heating a food article in said heating zone, said first source means when energized at a first voltage level producing radiation having maximum intensity at a wavelength between 0.72 $\mu$m and 2.5 $\mu$m and when energized at a second voltage level lower than said first voltage level producing radiation having maximum intensity at a wavelength greater than 2.5 $\mu$m, first conveyor means operable to carry at least one food article through said heating zone, means for energizing said source means at either said first or said second voltage level, sensing means for sensing the presence of a food article on said first conveyor means, control means adapted to change said source means energization from said second voltage level to said first voltage level in response to the sensing of a food article on said first conveyor means by said sensing means, means defining a loading position for said first conveyor means, means defining a discharge position for said first conveyor means, said first conveyor means comprising an endless belt having a run extending from said loading position for said first conveyor means, through said heating zone to said discharge position for said first conveyor means, second conveyor means, second source means of radiation which when energized provides radiation having maximum intensity at a wavelength between 0.7 $\mu$m and 2.5 $\mu$m, means defining a loading position for said second conveyor means, means defining a discharge position for said second conveoyr means, said second conveyor means extending from said loading position for said second conveyor means, beneath said second source means of radiation to said discharge position for said second conveyor means, whereby when a manufactured meat product is being cooked on said first conveyor means at least one dough product can be heated on said second conveyor means for subsequent association with said cooked meat product.

14. The apparatus of claim 13 further comprising guide means adapted to guide a heated dough product leaving said second conveyor means at said discharge position for said second conveyor means to the vicinity of said loading position for said second conveyor means.

15. The apparatus of claim 13 wherein said control means are arranged to energize said second radiation source means in response to said change of energization of said first source means of radiation.

16. The apparatus of claim 13 wherein said first conveyor means comprises a heat-retaining grid which, when said first source means is energized at said second voltage level, is maintained by radiation from said first source means at a temperature sufficiently high to cause searing of a food article when said food article is placed upon said heat-retaining grid.

* * * * *

UNITED STATES PATENT AND TRADEMARK OFFICE
CERTIFICATE OF CORRECTION

PATENT NO. : 4,421,015
DATED : December 20, 1983
INVENTOR(S) : Adrian G. Masters and Jeffery E. Munden It is certified that error appears in the above—identified patent and that said Letters Patent is hereby corrected as shown below:

Title Page:

Position 30, Line 3, delete "May 16, 1981".

Position 30, Line 3, insert --March 16, 1981--.

Signed and Sealed this

Eleventh Day of March 1986

[SEAL]

Attest:

DONALD J. QUIGG

Attesting Officer

Commissioner of Patents and Trademarks